United States Patent Office 3,141,734
Patented July 21, 1964

3,141,734
METHOD OF CLARIFYING ACIDIC PHOSPHATIC SOLUTIONS
Rudolf Ittlinger, Lakeland, Fla., assignor to International Minerals & Chemical Corporation, a corporation of New York
No Drawing. Filed Oct. 25, 1960, Ser. No. 64,719
6 Claims. (Cl. 23—165)

This invention generally relates to acidic phosphatic solutions. More particularly the invention relates to the preparation of solutions of inorganic, acidic phosphatic materials, such as wet process phosphoric acid, from which the "post-precipitation" of solids is minimized.

In conventional methods for the production of aqueous solutions of inorganic, acidic phosphatic materials, the reaction product which results from reacting phosphate rock with sulfuric acid is filtered and water leached to separate out the calcium sulfate and other solid impurities to yield a crude dilute aqueous acidic phosphatic solution product which is then concentrated to produce an aqueous acidic phosphatic solution in which is suspended a substantial quantity of solid impurities. The solution also contains dissolved impurities. The so-called wet process phosphoric acid of commerce is produced by such a process. Reference is made to Chapter 12 of the book "Phosphoric Acid, Phosphates and Phosphatic Fertilizers," by William H. Waggaman, 2nd Ed., 1952, published by Reinhold Publishing Corporation, for a detailed description of methods of manufacturing wet process phosphoric acid.

The problems occasioned by dissolved and suspended solid impurities are particularly acute with respect to wet process phosphoric acid. Conventional practice yields a crude wet process phosphoric acid containing from about 15% to about 30% by weight of phosphorus pentoxide ($P_2O_5$) and a substantial portion of suspended solid impurities which do not readily settle. Such crude, dilute wet process acid is normally concentrated to increase the $P_2O_5$ content to at least about 45% by weight and more frequently to at least 50% by weight. The resultant concentrated acid is usually very dark, sometimes almost black, in color. The concentration procedure necessarily also serves to proportionately increase the quantity of suspended solid impurities and yields concentrated acid solutions frequently containing from about 15% to about 30% by volume of suspended solids, which solids are particularly difficult to remove from the solution.

In general, it has been determined that the impurities present in wet process acidic phosphatic solutions, such as wet process phosphoric acid, comprise calcium sulfate anhydrite ($CaSO_4$), calcium sulfate hemihydrate ($CaSO_4 \cdot \frac{1}{2}H_2O$), iron, aluminum, sodium and potassium, organic compounds and other organic materials.

Upon standing in storage or during shipment in tank cars or the like, such acidic phosphatic solutions deposit a layer of solid matter which renders handling of the stored or shipped acid exceedingly difficult and frequently economically unfeasible. Some solids and color may be removed from the crude solution by filtration. However, the concentrated acid is very viscous and difficult to filter and further the solids are of such a nature that they readily blind the filter and the solids are very difficult to remove from the filter. Further, even when the acid has the solids removed therefrom as by filtration, upon standing solids form in the solution and settle out, thereby producing the same problem again. The solids which subsequently form in the solution and settle out of the solution are usually termed post-precipitated solids, and the mechanism is termed post-precipitation.

It is, accordingly, an object of the present invention to provide a method for removing impurities from acidic inorganic phosphatic solutions.

It is another object of this invention to provide a process for the production of wet process phosphoric acid which demonstrates substantially less post-precipitation of solids than conventional wet process phosphoric acid.

It is an additional important object of the invention to provide a wet process phosphoric acid sufficiently free of suspended solid impurities that may be shipped or stored without appreciable post-precipitation or sedimentation over an extended period of time.

It is a specific object of the invention to provide an economical process for the clarification of wet process phosphoric acid.

It is a more specific object of the invention to provide a process for the clarification of concentrated wet process phosphoric acid which is appropriate for installation in a conventional wet process phosphoric acid plant.

These and other objects and advantages of the present invention will be apparent from the description of the invention.

Now, in accordance with the present invention, it has been discovered that the quantity of solids post-precipitated from wet process phosphoric acid is considerably reduced when the level of sodium and/or potassium in the wet process phosphoric acid is reduced. Investigations of post-precipitation have indicated that it is the sodium and/or potassium content of wet process phosphoric acid that is troublesome with respect to post-precipitation. Solutions of phosphoric acid that are free of the alkali metals potassium and sodium do not exhibit any substantial degree of post-precipitation, whereas when sodium and/or potassium ions are added to these same solutions, solids form in the solutions.

As hereinbefore set forth, wet process phosphoric acid contains iron, aluminum, sodium and potassium impurities. Iron phosphates and aluminum phosphates are relatively soluble in wet process phosphoric acid. However, while not definitely established, investigations have indicated that the sodium and/or potassium which are, of course, not present in the elemental form but as ions, even though present in low concentrations in the wet process acid, form insoluble complexes with the iron and aluminum and it is these insoluble complexes which make up a substantial amount of the post-precipitated solids. Regardless of the mechanism of forming post-precipitated solids, solutions of phosphoric acid having very low levels of sodium and/or potassium exhibit less post-precipitation than phosphoric acid containing greater concentrations of these alkali metals. The present invention therefore embraces reducing the quantity of solids post-precipitated from acidic phosphatic solutions by removing a substantial amount of sodium and/or potassium from the solution.

Solutions of acidic inorganic phosphates containing suspended solid impurities can efficiently be clarified by mixing said solutions with a silicofluoride clarification agent, said clarification agent being employed in a minor amount, and thereafter separating a clarified acidic fraction.

The silicofluoride-containing clarification agents generally comprise compounds which produce silicofluoride ions ($SiF_6^=$) when in the acidic inorganic phosphate solution treated, such as fluosilicic acid ($H_2SiF_6$), ammonium silicofluoride [$(NH_4)_2SiF_6$], zinc silicofluoride ($ZnSiF_6$), lithium silicofluoride ($Li_2SiF_6$), copper silicofluoride ($CuSiF_6$), silver silicofluoride ($Ag_2SiF_6$), etc. The silicofluoride compound should be soluble in water and more specifically should be soluble in the acidic phosphatic solution to be clarified and should be more soluble than sodium silicofluoride ($Na_2SiF_6$) and potassium silicofluoride ($K_2SiF_6$), which sodium and potassium compounds do not produce any substantial amount of silicofluoride ions in the solution. The invention contemplates the utilization as clarification agents of individual or essentially pure compounds, and mixtures thereof, as well as materials containing these substances.

Fluosilicic acid is a specifically preferred silicofluoride clarification agent since it is readily available and has produced good results. Further, when adding fluosilicic acid to the acidic phosphatic solution, the acidity of the acidic phosphatic solution is not appreciably affected and no foreign cations are introduced into the solution.

Sodium silicofluoride and potassium silicofluoride are substantially insoluble in wet process phosphoric acid, and therefore, when a silicofluoride ion is introduced into the solution, the sodium and/or potassium silicofluoride solids tend to form, thereby removing sodium and/or potassium from the solution. Again, regardless of the mechanism whereby the amount of post-precipitated solids is reduced, the addition of silicofluoride ions to the wet process acid, effects the production of a wet process acid demonstrating substantially less post-precipitation of solids compared to an untreated acid. In other words, the silicofluoride clarification reagent cooperates in the clarification of the acid to yield a wet process phosphoric acid product superior to that which results from a conventional clarification of crude wet process phosphoric acid. This is fully demonstrated in the ensuing example.

The silicofluoride clarification agents of this invention are effective to some degree in substantially all proportions such that the relative amounts thereof utilized do not constitute an essential feature of the invention. In general, the rate of clarification or settling of solids and the degree of reduction of post-precipitation varies directly with the amount of clarification agent. The practical upper limit of clarification agent concentration is determined to a significant extent by economic considerations including cost of the clarification agent, and cost of separation of precipitated solids from the clarified acidic solution. Normally, the clarification agents are employed in a minor proportion requisite to provide from about 0.005 to about 75 pounds and preferably from about .1 to about 25 pounds of clarification agent per ton of acidic solution to be clarified.

Clarification agents may tend to form agglomerates or lumps when mixed with the acidic phosphatic solutions to be clarified. Accordingly, conventional expedients to effect uniform dispersion of the clarification agent in the acidic phosphatic solution with a minimum formation of large particles are appropriately utilized. Such expedients include, inter alia, relatively slow addition of the clarification agent to the acidic phosphatic solution treated accompanied by vigorous agitation. The silicofluoride clarification agent is preferably in solution and, therefore, it is preferable to make up a solution of the silicofluoride compound and to add the solution to the acidic phosphatic solution. The solution may readily be made up by using a water-soluble silicofluoride compound and dissolving the compound in water to form an aqueous solution. Fluosilicic acid may, of course, also be used.

The process of the invention can be practiced under any desired temperature conditions. The settling rate of the suspended solids and the quantity of solids remaining in the clarified acid are, respectively, directly and inversely proportional to the treatment and settling temperature. Accordingly, the practice of the invention at elevated temperatures is preferred. The clarification procedure is preferably performed at temperatures within the range of from about 120° F. to about 250° F., and more preferably from about 150° F. to about 250° F. However, as herein set forth, higher or lower temperatures may be used. Generally, lower temperatures increase the viscosity of the solution with consequent reduction in the settling rate.

The process of the invention is effective in the clarification of acidic phosphatic solutions in all concentrations. Acid phosphate solutions formed by the leaching of acidulated phosphate rock may constitute substantially calcium-free phosphoric acid, or depending upon the degree of acidulation, approach monocalcium phosphate solutions characterized by a $CaO/P_2O_5$ mole ratio of about 1:1. The invention is useful in the clarification of all such solutions and more specifically is applicable to acidic phosphatic solutions ranging from phosphoric acid to monocalcium phosphate. In general, the wet process phosphoric acids of commerce have a $P_2O_5$ content of about 40% and the present invention finds particular application in preparing clarified fractions from such oils. When dilute acid is clarified in accordance with the process of this invention, the acidic phosphatic solution may, when desired, be concentrated, for example to over 50% $P_2O_5$ content.

Conventional commercial flocculating agents, stable in concentrated mineral acids, and specifically stable in the acidic phosphatic solution being treated, may also be utilized with the silicofluoride clarifying agent of this invention, to expedite the solids settling rate and yield clarified acidic solutions. Flocculating agents suitable for such utilization include water-soluble high molecular weight synthetic polymers such as the polyacrylamides which are sold under the commercial trade name "Separan," guar, the hydrolyzed polyacrylonitrile resins or the salts thereof such as the sodium and potassium salts, and the like. Such commercial flocculating agents are employed in the conventional manner normally in water solution, in about 0.05 to about 2% by weight, in an amount requisite to provide from about 0.001 to about 2 pounds thereof per ton of acidic phosphatic solution treated, and more preferably from about 0.003 to about 0.5 pound per ton of acidic phosphatic solution treated.

After the addition of the clarification agent, and after the addition of the flocculating agent when used, the mixture is handled in a manner to permit the solids to settle out to produce a clarified fraction and a solids-carrying fraction. The mixture may be maintained quiescent thereby permitting the solids to settle or the mixture may be centrifuged thereby settling the solids. Other methods of settling solids in a liquid may, of course, be used.

The sludge or solids layer resulting from the clarification of acidic phosphatic solutions in accordance with this invention contains a substantial proportion of $P_2O_5$ and is useful, inter alia, in the manufacture of fertilizers and particularly as a binding agent for the manufacture of granulated phosphatic fertilizers.

In order to give a fuller understanding of the invention, but with no intention to be limited thereto, the following specific example is given.

*Example*

Four examples, designated A, B, C and D, of fresh filtered concentrated wet process phosphoric acid having a $P_2O_5$ content of about 54% were placed in beakers in a water bath maintained at 176° F.

Samples A, B and C were clarified pursuant to this invention. Technical grade 30% fluosilicic acid was used in clarifying these samples. A different amount of fluosilicic acid was used to treat each sample. The fluosilicic was added to the wet process phosphoric acid sample and stirred. The sample was then maintained quiescent in an oven maintained at 167° F. At the end of 24 hours the solids content of the sample was determined. The supernatant liquid was then decanted from the sample and the supernatant liquid was maintained quiescent at room temperature for an additional 7 days. At the end of 7 days the solids content was again measured.

Sample D was utilized as a control, with no additive being added to the sample.

The results of these tests are indicated below in the table:

| Sample | Additive | Amount in Lbs. $H_2SiF_6$/Ton of Acid Solution | Weight percent of Solids Settled | |
|---|---|---|---|---|
| | | | 24 hrs at 167° F. | 7 days at room temp. |
| A | $H_2SiF_6$ | 45 | 6.40 | 0.12 |
| B | $H_2SiF_6$ | 22.5 | 6.29 | 0.14 |
| C | $H_2SiF_6$ | 7.5 | 5.92 | 0.16 |
| D | None | | 4.24 | 0.26 |

The results of the tests clearly indicate that the use of fluosilicic acid in accordance with this invention produced an acid having a very low amount of post-precipitation. The results also illustrate that when following the teachings of this invention a greater amount of solids are precipitated from the solution.

The invention, as illustrated by the foregoing example, affords an efficient and economical method for the rapid clarification of wet process acidic phosphatic solutions. The clarified product is of good quality and the sludge or solids material formed finds utility in the fertilizer industry. The invention accordingly represents a significant contribution to the art.

The description of the invention utilized specific reference to certain process details; however, it is to be understood that such details are illustrative only and not by way of limitation. Other modification and equivalents of the invention will be apparent to those skilled in the art from the foregoing description.

Having now fully described and illustrated the invention, what is desired to be secured and claimed by Letters Patent is set forth in the appended claims.

I claim:
1. The method for reducing the quantity of solids post-precipitated from an aqueous acidic inorganic phosphatic solution, said solution being characterized by a CaO to $P_2O_5$ mole ratio in the range 0-1 to 1-1, which solution normally post-precipitates salts of iron and aluminum comprising adding to said solution a silicofluoride clarification agent capable of providing silicofluoride ions, said agent being more soluble in said solution than sodium silicofluoride and more soluble in said solution than potassium silicofluoride and being added in a minor amount sufficient to precipitate in substantial quantities an impurity containing ions of the group consisting of sodium and potassium ions from said solution, and thereafter separating said precipitated impurity from said solution.

2. The method of reducing a quantity of solids post-precipitated from a wet process phosphoric acid solution which normally post-precipitates salts of iron and aluminum comprising adding to said solution a silicofluoride clarification agent capable of providing silicofluoride ions, said agent being more soluble in said solution than sodium silicofluoride and more soluble in said solution than potassium silicofluoride and being added in a minor amount sufficient to precipitate in substantial quantities an impurity containing ions of the group consisting of sodium and potassium ions from said solution, and thereafter separating said precipitated impurity from said solution.

3. A process in accordance with claim 2 wherein said clarification agent is employed in an amount requisite to provide from about 0.05 to about 75 lbs. thereof per ton of phosphoric acid solution treated.

4. The process in accordance with claim 2 wherein said silicofluoride clarification agent is employed in an amount requisite to provide about 0.01 to about 25 lbs. thereof per ton of wet process phosphoric acid treated.

5. The method in accordance with claim 4 wherein said clarification agent consists essentially of fluosilicic acid.

6. The method in accordance with claim 5 in which said impurities are precipitated at a temperature in the range of 170° to 260° F.

References Cited in the file of this patent
UNITED STATES PATENTS

| 1,579,984 | La Bour | Aug. 31, 1926 |
| 1,676,556 | Howard | July 10, 1928 |
| 1,858,203 | Fiske et al. | May 10, 1932 |
| 2,917,367 | Hodges et al. | Dec. 15, 1959 |
| 2,936,888 | Williams | May 17, 1960 |

OTHER REFERENCES

Waggaman: Phosphoric Acid, Phosphates, and Phosphatic Fertilizers; 2nd Edition. Reinhold Publishing Company, New York, 1952. Pages 181-183.